US012589297B2

(12) United States Patent
Yuan et al.

(10) Patent No.: US 12,589,297 B2
(45) Date of Patent: Mar. 31, 2026

(54) IMAGE PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhiqiang Yuan, Shenzhen (CN); Xinda Zhao, Shenzhen (CN); Yandong Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 625 days.

(21) Appl. No.: 17/989,506

(22) Filed: Nov. 17, 2022

(65) Prior Publication Data

US 2023/0083331 A1 Mar. 16, 2023

Related U.S. Application Data

(63) Continuation of application No. PCT/CN2022/085728, filed on Apr. 8, 2022.

(30) Foreign Application Priority Data

May 17, 2021 (CN) .......................... 202110536966.7

(51) Int. Cl.
*A63F 13/52* (2014.01)
*G06F 9/50* (2006.01)
(Continued)

(52) U.S. Cl.
CPC ............ *A63F 13/52* (2014.09); *G06F 9/5027* (2013.01); *G06T 7/40* (2013.01); *G06T 9/00* (2013.01)

(58) Field of Classification Search
CPC .. A63F 13/52; A63F 13/355; A63F 2300/203; G06F 9/5027; G06F 9/5066; G06F 9/509; G06T 7/40; G06T 9/00
See application file for complete search history.

(56) References Cited

U.S. PATENT DOCUMENTS 8,212,825 B1 * 7/2012 Everitt .................. G06T 15/005
345/505
8,452,111 B2 * 5/2013 Boulton ................. H04N 19/64
382/240
(Continued)

FOREIGN PATENT DOCUMENTS

CN 103608848 A 2/2014
CN 108024115 A 5/2018
(Continued)

OTHER PUBLICATIONS

PCT/CN2022/085728, international preliminary report on patentability, downloaded from wipo.int, Mar. 10, 2025.*
(Continued)

*Primary Examiner* — David L Lewis
*Assistant Examiner* — Matthew D Hoel
(74) *Attorney, Agent, or Firm* — Anova Law Group, PLLC

(57) ABSTRACT

An image processing method includes: obtaining a target compression texture resource of a target image, the target compression texture resource including a plurality of compression texture blocks; allocating a plurality of target work groups for decoding to the plurality of compression texture blocks in a graphic card shader, and distributing each compression texture block to a corresponding target work group; and decoding in parallel, by the target work groups in the graphic card shader, the compression texture blocks according to the compression texture format, to obtain target
(Continued)

texture data of the target image, the target texture data comprising decoded data corresponding to the compression texture blocks.

20 Claims, 10 Drawing Sheets

(51) Int. Cl.

| | | |
|---|---|---|
| *G06T 7/40* | (2017.01) | |
| *G06T 9/00* | (2006.01) | |

(56) References Cited

U.S. PATENT DOCUMENTS

| | | | | |
|---|---|---|---|---|
| 9,092,267 | B2 * | 7/2015 | Arvo ..................... | G06F 9/5033 |
| 9,378,560 | B2 * | 6/2016 | Iourcha ..................... | G06T 1/20 |
| 10,453,274 | B2 | 10/2019 | Kwon et al. | |
| 10,650,566 | B2 * | 5/2020 | Nevraev ................... | G06T 1/20 |
| 2009/0304291 | A1 * | 12/2009 | Boulton ................. | H04N 19/14 |
| | | | | 382/233 |
| 2012/0320067 | A1 * | 12/2012 | Lourcha ................... | G06T 1/20 |
| | | | | 345/501 |
| 2012/0320070 | A1 * | 12/2012 | Arvo ..................... | G06F 9/5033 |
| | | | | 345/522 |
| 2015/0145876 | A1 * | 5/2015 | Sun .......................... | G06T 1/60 |
| | | | | 345/520 |
| 2016/0300320 | A1 | 10/2016 | Iourcha et al. | |
| 2018/0232936 | A1 * | 8/2018 | Nevraev ................... | G06T 1/20 |
| 2021/0312668 | A1 * | 10/2021 | Iourcha ..................... | G06T 1/20 |

FOREIGN PATENT DOCUMENTS

| | | | |
|---|---|---|---|
| CN | 110291563 | A | 9/2019 |
| CN | 113034629 | A | 6/2021 |

OTHER PUBLICATIONS

PCT/CN2022/085728, international search report, downloaded from wipo.int, Mar. 10, 2025.*

PCT/CN2022/085728, written opinion, downloaded from wipo.int, Mar. 10, 2025.*

Machine translation of Chinese patent publication CN 104679486 A, obtained from STIC, Mar. 11, 2025.*

Machine translation of Chinese patent publication CN 108024115 A, obtained from STIC, Mar. 11, 2025.*

Machine translation of Chinese patent publication CN 109005160 A, obtained from STIC, Mar. 11, 2025.*

Machine translation of Chinese patent publication CN 110291563, obtained from STIC, Mar. 11, 2025.*

Machine translation of Chinese patent publication CN 110992240, obtained from STIC, Mar. 11, 2025.*

Machine translation of Chinese patent publication CN 112437341, obtained from STIC, Mar. 11, 2025.*

Machine translation of Chinese patent publication CN 113034629, obtained from STIC, Mar. 11, 2025.*

The World Intellectual Property Organization (WIPO) International Search Report for PCT/CN2022/085728 Jun. 29, 2022 7 Pages (including translation).

The Japan Patent Office (JPO) Notification of Reasons for Refusal for Application No. 2023-538900 and Translation May 21, 2024 9 Pages.

Pavel Krajcevski et al., "GST: GPU-deco dable Supercompressed Textures", ACM Trans. Graph., ACM, Nov. 2016, vol. 35, No. 6, Article 230, pp. 1-10.

André Weissenberger et al., "Massively parallel ans decoding on gpus." Proceedings of the 48th International Conference on Parallel Processing. 2019.

Fan Gong et al. "Cooperative DVFS for energy-efficient HEVC decoding on embedded CPU-GPU architecture." Proceedings of the 54th Annual Design Automation Conference 2017. 2017.

* cited by examiner

IMAGE PROCESSING METHOD AND APPARATUS, COMPUTER DEVICE, AND STORAGE MEDIUM

CROSS-REFERENCES TO RELATED APPLICATIONS

This application is a continuation application of PCT Patent Application No. PCT/CN2022/085728, filed on Apr. 8, 2022, which claims priority to Chinese Patent Application No. 202110536966.7, entitled "IMAGE PROCESSING METHOD AND APPARATUS, COMPUTER DEVICE, AND STORAGE MEDIUM" and filed with the National Intellectual Property Administration, PRC on May 17, 2021, the entire contents of both of which are incorporated herein by reference.

FIELD OF THE TECHNOLOGY

The present disclosure relates to the field of Internet technologies, and specifically to image processing technologies.

BACKGROUND OF THE DISCLOSURE

At present, in the process of creating an image, to reduce memory occupied by the image and network resources required to transmit the image, an image creator may use compression texture format to perform compression encoding on the image to obtain a compression texture resource and release the compression texture resource to external receivers. Accordingly, a receiver device may decode the compression texture resource of the image after obtaining the compression texture resource.

SUMMARY

Embodiments of the present disclosure provide an image processing method and apparatus, a computer device, and a storage medium, so that while the decoding of a target compression texture resource is implemented, the decoding efficiency can be effectively improved.

According to an aspect, the embodiments of the present disclosure provide an image processing method, the method being performed by a computer device, the method including: obtaining a target compression texture resource of a target image, the target compression texture resource having a corresponding compression texture format, the target compression texture resource including a plurality of compression texture blocks; allocating a plurality of target work groups for decoding to the plurality of compression texture blocks in a graphic card shader, and distributing each compression texture block to a corresponding target work group; and decoding in parallel, by the target work groups in the graphic card shader, the compression texture blocks according to the compression texture format, to obtain target texture data of the target image, the target texture data comprising decoded data corresponding to the compression texture blocks.

According to another aspect, the embodiments of the present disclosure provide an image processing apparatus, the apparatus being deployed on a computer device, the apparatus including: an obtaining unit, configured to obtain a target compression texture resource of a target image, the target compression texture resource being obtained by encoding the target image by using a compression texture format, the target compression texture resource including a plurality of compression texture blocks; and a processing unit, configured to: allocate a plurality of target work groups for decoding to the plurality of compression texture blocks in a graphic card shader, and distribute each compression texture block to a corresponding target work group, the processing unit being further configured to: decode in parallel, by the target work groups in the graphic card shader, the compression texture blocks according to the compression texture format, to obtain target texture data of the target image, the target texture data comprising decoded data corresponding to the compression texture blocks.

According to still another aspect, the embodiments of the present disclosure provide a computer device, the computer device including an input interface and an output interface, the computer device further including: a graphic card shader and a computer storage medium, the computer storage medium storing one or more instructions, the one or more instructions being suitable to perform the image processing method in the foregoing aspects.

According to still another aspect, the embodiments of the present disclosure provide a non-transitory computer storage medium, the computer storage medium storing one or more instructions, the one or more instructions being suitable to perform the image processing method in the foregoing aspects.

In the embodiments of the present disclosure, a graphic card shader is introduced, and a plurality of work groups independent of each other are deployed in advance in the graphic card shader. A target compression texture resource obtained by encoding a target image by using a compression texture format includes a plurality of compression texture blocks. After the target compression texture resource of the target image is obtained, one target work group for decoding may be respectively allocated to each compression texture block in the graphic card shader, and each compression texture block is distributed to a corresponding target work group. Next, a received compression texture block may be decoded according to the compression texture format in a manner of invoking target work groups in the graphic card shader in parallel. In such a processing manner, the decoding of a target compression texture resource can be implemented, and parallel decoding of each compression texture block can be implemented, thereby effectively improving the decoding efficiency. In addition, the entire decoding process is implemented by using the graphic card shader, so that the entire decoding process does not require the participation of a central processing unit (CPU). In this way, resources of the CPU can be effectively saved, thereby effectively reducing the resource usage of the CPU and improving the running efficiency of a computer device.

BRIEF DESCRIPTION OF THE DRAWINGS

To describe the technical solutions in the embodiments of the present disclosure more clearly, the accompanying drawings required in the description of the embodiments are briefly described below. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

Figure 1A:
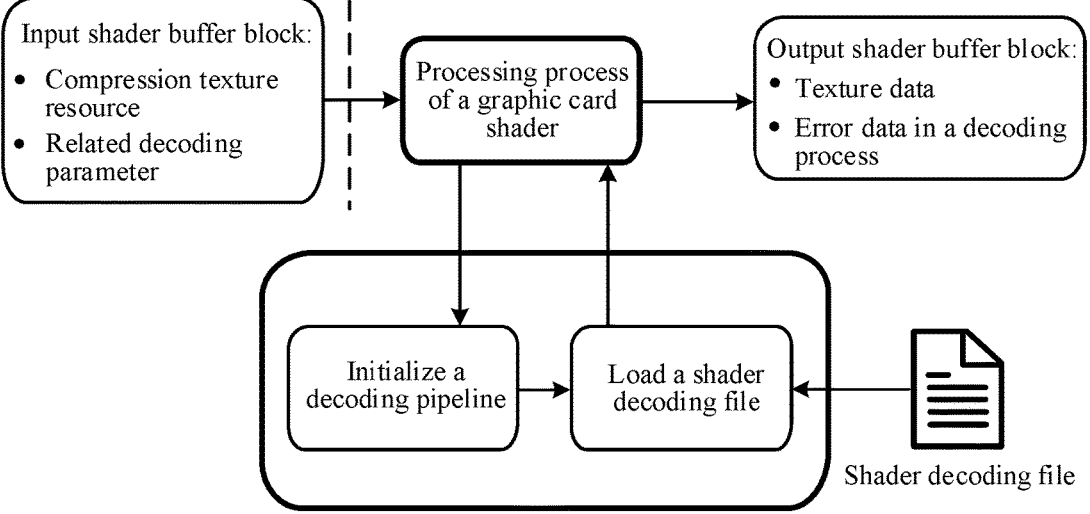
FIG. 1A is a schematic diagram of a decoding procedure in an image processing solution according to an embodiment of the present disclosure.

The following clearly and completely describes technical solutions in embodiments of the present disclosure with reference to the accompanying drawings in the embodiments of the present disclosure.

With the continuous development of Internet technology, Artificial Intelligence (AI) technology has also been better developed. The AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology mainly attempts to understand the essence of intelligence and produce a new intelligent machine that can react in a manner similar to human intelligence, to provide the intelligent machine with multiple functions such as perception, reasoning, and decision making Correspondingly, the AI technology is a comprehensive discipline, which mainly includes several major directions such as a computer vision (CV) technology, a speech processing technology, a natural language processing technology, and machine learning (ML)/deep learning (DL).

The CV technology is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biometric feature recognition technologies such as common face recognition and fingerprint recognition.

Based on the image processing technology in the CV technology discussed above, the embodiments of the present disclosure provide an image processing solution to implementing the decoding of a compression texture resource of any image. The compression texture resource is an encoding result obtained by encoding an image by using a compression texture format. The compression texture format may be an Adaptive Scalable Texture Compression (ASTC) format, an ETC format (a compression texture format), or the like. In ASTC and ETC, pixels are usually compressed and stored in compression texture blocks (referred to as blocks for short). Quantities of pixels compressed in different blocks may range from 4×4 to 12×12, and blocks are independent of each other. That is, the compression texture resource obtained by encoding the image by using the compression texture format may usually include a plurality of compression texture blocks. The meaning of "a plurality of" discussed in the embodiments of the present disclosure refers to "at least two".

During implementation, the image processing solution may be performed in a computer device. The computer device may be a terminal or a server. The terminal discussed herein may include, but not limited to, a smartphone, a tablet computer, a notebook computer, a desktop computer, a smart watch, and a smart television. The terminal may run various clients (applications, APPs), for example, a game client, a multimedia client, and a social networking client. The server discussed herein may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

In addition, the computer device may be located outside a blockchain network or may be located inside a blockchain network. This is not limited herein. The blockchain network is a network formed by a point-to-point (P2P) network and a blockchain. The blockchain is a novel application mode of computer technologies such as distributed data storage, P2P transmission, a consensus mechanism, and an encryption algorithm, which is essentially a decentralized database, and is a chain of data blocks (or referred to as blocks) generated through association by using a cryptographic method. When the computer device is located inside a blockchain network or has a communication connection with a blockchain network, the computer device may upload internal data to a blockchain in the blockchain network for storage to prevent the internal data of the computer device from being tampered, thereby improving the security of the internal data.

In one embodiment, the computer device may include at least a graphics processing unit (GPU), a graphic card computational shader (referred to as a graphic card shader hereinafter), a computational shader decoding pipeline (referred to as a decoding pipeline hereinafter), and the like. (1) A graphic card is a device that uses a GPU as the center and is configured to undertake the task of outputting a display image. (2) A graphic card shader is a processing unit run in the graphic card, and may be connected to an input graphic card shader buffer block configured to input data and an output graphic card shader buffer block configured to output data. The graphic card shader may include M work groups having a decoding capability. The work groups may be understood as sub-processing units having a decoding capability in the graphic card shader. The work groups are independent of each other, and M is an integer greater than 1. (3) A decoding pipeline is a processing unit configured to indicate a decoding procedure of the graphic card shader. That is, the graphic card shader in the embodiments of the present disclosure works according to the procedure specified by the decoding pipeline. The computer device may further include rendering pipelines. The rendering pipelines may also be referred to as rendering assembly lines, and are parallel processing units that process graphic signals inside a graphic card and are independent of each other. When the computer device includes a rendering pipeline, after decoding is performed by using an image processing solution to obtain texture data of any image, the rendering and display of the any image may be further implemented by using the rendering pipeline according to the texture data obtained through decoding.

The image processing solution provided in the embodiments of the present disclosure is mainly using a graphic card shader in a computer device to decode a compression texture resource of any image. Referring to FIG. 1A, a decoding procedure of the image processing solution is generally as follows: First, a decoding pipeline in the computer device may be initialized, and a shader decoding file is loaded; and after the shader decoding file is successfully loaded, the shader decoding file may be transmitted to the graphic card shader in the computer device. After a compression texture resource of any image and a related decoding parameter of the compression texture resource are inputted into the graphic card shader in the computer device by using an input shader buffer block, the graphic card shader may respectively allocate one target work group (that is, a work group to which a compression texture block is allocated) to each compression texture block in the compression texture resource.

Figure 1B:
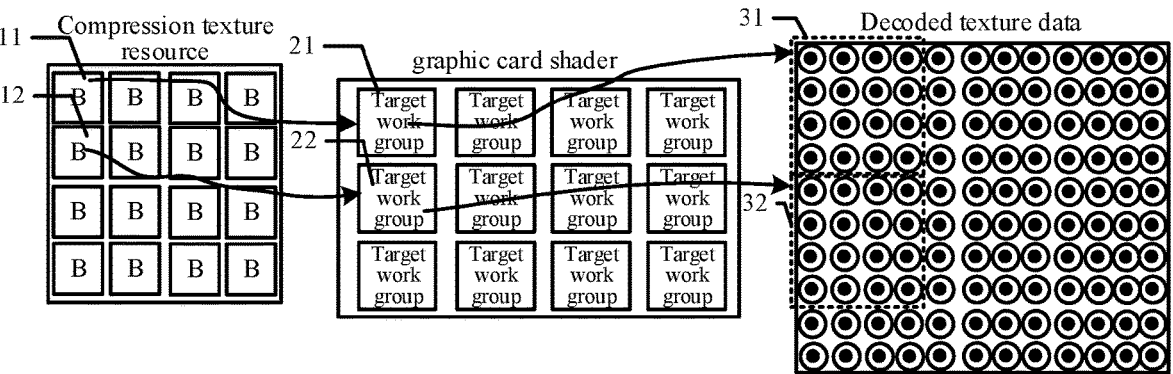
FIG. 1B is a schematic diagram of a decoding procedure of a graphic card shader according to an embodiment of the present disclosure.

Next, compression texture blocks may be respectively distributed to corresponding target work groups. The target work groups decode received compression texture blocks in parallel according to the related decoding parameter and the shader decoding file to implement the decoding of a compression texture resource of any image, to obtain texture data of the any image. 4×4 blocks (compression texture blocks) are used as an example, and "B" represents each compression texture block. Referring to FIG. 1B, a compression texture block 11 in a compression texture resource may be distributed to a target work group 21 in the graphic card shader to obtain decoded data identified by 31. A compression texture block 12 in the compression texture resource may be distributed to a target work group 22 in the graphic card shader for decoding, to obtain decoded data identified 32. The rest is deduced by analogy. After texture data of any image is obtained, the graphic card shader may further output the texture data of the any image by using the output shader buffer block. In one embodiment, when one or more compression texture blocks fail to be decoded in a process of decoding a compression texture resource in the graphic card shader, the graphic card shader may further output error data in the decoding process by using the output shader buffer block, to allow a related technician to analyze the cause of a decoding failure according to the error data in time.

It has been shown in practice that the image processing solution provided in the embodiments of the present disclosure may have at least the following beneficial effects: (1) The entire decoding process is implemented by introducing the graphic card shader, so that the entire decoding process does not require the participation of a CPU. In this way, resources of the CPU can be effectively saved, thereby effectively reducing the resource usage of the CPU and improving the running efficiency of a computer device. (2) The parallel decoding of each compression texture block can be implemented in a manner of invoking target work groups in the graphic card shader in parallel, thereby effectively improving the decoding efficiency.

Figure 2:
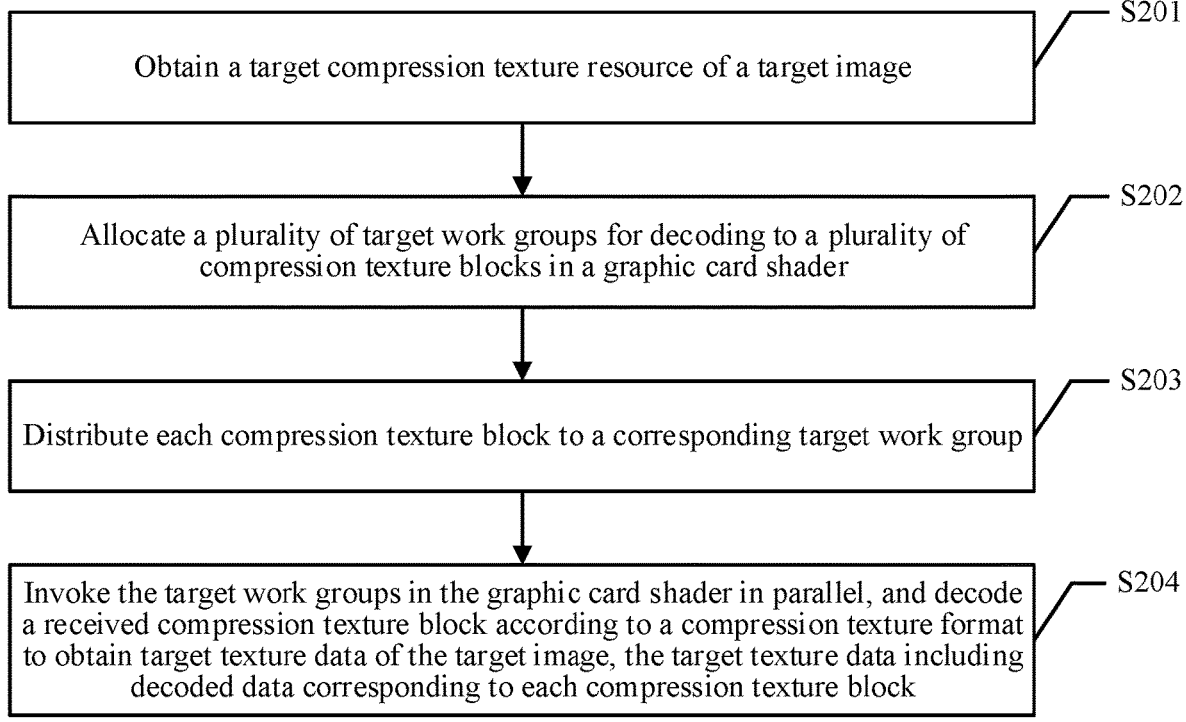
FIG. 2 is a schematic flowchart of an image processing method according to an embodiment of the present disclosure.

Based on the foregoing description, the embodiments of the present disclosure provide an image processing method. The image processing method may be performed in the computer device discussed above. The computer device may include a rendering pipeline, a decoding pipeline, and a graphic card shader, and the graphic card shader works according to a procedure specified by the decoding pipeline. Referring to FIG. 2, the image processing method may include the following S201 to S204:

S201: Obtain a target compression texture resource of a target image.

The target image may be any image in the following: a target game picture image in a target game, a video image in any movie or television show, a selfie image of any user, a scenery image of any scenic spot, and the like. The target compression texture resource is obtained by encoding the target image by using a compression texture format. The target compression texture resource includes a plurality of compression texture blocks. The target image includes texture data in a texture format. The texture format may be, for example, an RGBA format. R in RGBA represents a red channel, G represents a green channel, B represents a blue channel, and A represents a transparent channel. A process of encoding the target image by using the compression texture format may be understood as a process of converting the texture data of the target image from the texture format into the compression texture format. Correspondingly, the essence of decoding the target compression texture resource may be understood as the processing of converting the target compression texture resource from the compression texture format into the texture format.

In one embodiment, when the target compression texture resource of the target image is not stored in the local space of the computer device in advance, the embodiment of S201 may be: sending a resource obtaining request to another device storing the target compression texture resource, to request the another device to return the target compression texture resource; and then the computer device may receive the target compression texture resource. When the target compression texture resource of the target image is stored in the local space of the computer device in advance, the computer device may load the target compression texture resource from the local space by using the internal rendering pipeline to obtain the target compression texture resource. That is, the embodiment of S201 may be: loading, by the rendering pipeline, the target compression texture resource of the target image from the local space of the computer device.

S202: Allocate a plurality of target work groups for decoding to a plurality of compression texture blocks in the graphic card shader.

As can be seen from above, the graphic card shader may include M work groups. Each work group has a decoding capability, and each work group has one sequence number identifier. During implementation, the plurality of compression texture blocks may be traversed, and a current compression texture block being traversed currently may be determined. It is taken into consideration that a quantity of work groups in the graphic card shader may be the same as or different from a quantity of compression texture blocks. When the quantity of work groups in the graphic card shader is less than the quantity of compression texture blocks, an unallocated work group may not exist in the graphic card shader during the allocation of the target work group to the current compression texture block. Based on this, to appropriately allocate the target work group to the current compression texture block being traversed currently, it may be first detected whether an unallocated remaining work group exists in the M work groups in the graphic card shader, so that the target work group is allocated to the current compression texture block by using a different allocation logic according to a detection result. Specifically:

When an unallocated remaining work group exists in the M work groups in the graphic card shader, one target work group for decoding may be allocated to the current compression texture block from the remaining work group. There may be one or more remaining work groups. In an embodiment, one remaining work group may be randomly selected from remaining work groups as the target work group for decoding the current compression texture block. In another embodiment, a remaining work group with the smallest sequence number identifier in remaining work groups may be selected in ascending order of sequence number identifiers as the target work group for decoding the current compression texture block. In another embodiment, when the work groups in the graphic card shader have different decoding capabilities, according to decoding capabilities of remaining work groups, a remaining work group with the highest decoding capability may be selected or a remaining work group with a decoding capability greater than a capability threshold may be selected from the remaining work groups as the target work group for decoding the current compression texture block.

When all the work groups in the M work groups have been allocated to compression texture blocks, one target work group for decoding may be allocated to the current compression texture block from the M work groups. In an embodiment, one work group may be randomly selected from the M work groups as the target work group for decoding the current compression texture block. In another embodiment, a work group with the smallest texture block quantity may be selected from the M work groups according to texture block quantities of compression texture blocks allocated to the work groups as the target work group for decoding the current compression texture block. In this embodiment, the texture block quantities of the work groups can be effectively balanced to reduce a duration of waiting for decoding of the current compression texture block, thereby improving the decoding efficiency. In another embodiment, when the work groups in the graphic card shader have different decoding capabilities, according to decoding capabilities of the work groups, a work group with the highest decoding capability may be selected or a work group with a decoding capability greater than a capability threshold may be selected from the M work groups as the target work group for decoding the current compression texture block.

(1) As can be seen based on the foregoing description, one target work group may be allocated to one or more compression texture blocks. When a quantity (that is, M) of work groups in the graphic card shader is greater than or equal to a quantity of compression texture blocks in the target compression texture resource, one target work group may be allocated to one compression texture block. When the quantity (that is, M) of work groups in the graphic card shader is less than the quantity of compression texture blocks in the target compression texture resource, some or all target work groups are allocated to at least two compression texture blocks. (2) As can be seen based on the foregoing description, in the embodiments of the present disclosure, the compression texture blocks in the target compression texture resource are sequentially traversed, to sequentially allocate the target work groups to the compression texture blocks. However, in other implementation, a batch allocation mode may be used, and the target work groups are allocated to the compression texture blocks. This step is not limited.

For example, the quantity of compression texture blocks in the target compression texture resource is set to N, N being an integer greater than 1. When M (the quantity of work groups in the graphic card shader) is greater than or equal to N, N target work groups for decoding may be selected in batches from the M work groups in the graphic card shader, and then the N target work groups are allocated to N compression texture blocks according to the principle that one target work group corresponds to one compression texture block. When M is less than N, the M work groups may all be used as target work groups, M compression texture blocks are selected in batches from the target compression texture resource, and then the M target work groups are allocated to the selected M compression texture blocks according to the principle that one target work group corresponds to one compression texture block. When a quantity of unselected compression texture blocks in the N compression texture blocks (that is, N−M) is less than M, N−M target work groups may be selected from the M work groups, and then the N−M target work groups are allocated to the N−M unselected compression texture blocks according to the principle that one target work group corresponds to one compression texture block. When N−M is greater than or equal to M, the M work groups may all be selected as the target work groups, M compression texture blocks are selected from the N−M unselected compression texture blocks in batches, and then the M target work groups are allocated to the M compression texture blocks according to the principle that one target work group corresponds to one compression texture block. The rest is deduced by analogy, until a target work group has been allocated to every compression texture block.

S203: Distribute each compression texture block to a corresponding target work group.

S204: Invoke the target work groups in the graphic card shader in parallel, and decode a received compression texture block according to a compression texture format to obtain target texture data of the target image, the target texture data including decoded data corresponding to each compression texture block. In other words, S204 includes decoding in parallel, by the target work groups in the graphic card shader, the compression texture blocks according to the compression texture format, to obtain target texture data of the target image, the target texture data comprising decoded data corresponding to the compression texture blocks.

In one embodiment, an embodiment of decoding the received compression texture block by any target work group is as follows: obtaining a shader decoding file, and obtaining a target decoding parameter related to the target compression texture resource. The shader decoding file may include: a plurality of algorithm instructions used for decoding compression texture resources in different compression texture formats. The target decoding parameter of the target compression texture resource may be used for indicating the compression texture format used in the target image. Next, an algorithm instruction for decoding the target compression texture resource may be obtained from the shader decoding file according to the target decoding parameter, and a corresponding compression texture block is decoded by using the obtained algorithm instruction, to obtain decoded data corresponding to the corresponding compression texture block.

For example, the shader decoding file may include: a first algorithm instruction used for implementing decoding of a compression texture resource in an ASTC format, a second algorithm instruction used for implementing decoding of a compression texture resource in an ETC format, and the like. When the target decoding parameter of the target compression texture resource is used for indicating that the compression texture format used in the target image is the ASTC format, the first algorithm instruction may be obtained from the shader decoding file according to the target decoding parameter, and the corresponding compression texture block is decoded by using the first algorithm instruction. When the target decoding parameter of the target compression texture resource is used for indicating that the compression texture format used in the target image is the ETC format, the second algorithm instruction may be obtained from the shader decoding file according to the target decoding parameter, and the corresponding compression texture block is decoded by using the second algorithm instruction.

To facilitate decoding, a specific procedure of the foregoing decoding may be encapsulated into a decoding interface (glDispatchCompute) in one decoding pipeline, so that any target work group may directly invoke a compression texture block corresponding to the decoding interface to perform decoding.

Figure 3A:
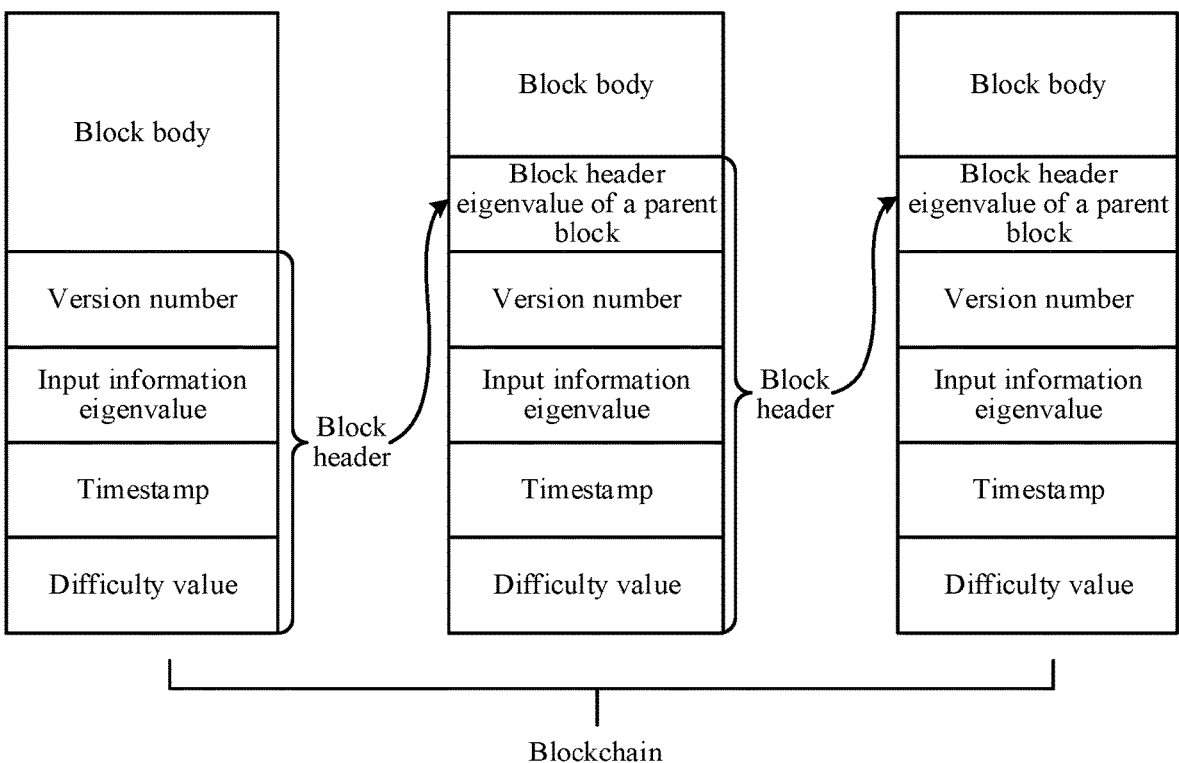
FIG. 3A is a schematic structural diagram of a blockchain according to an embodiment of the present disclosure.

In one embodiment, after obtaining the target texture data, the computer device may further upload the target texture data to a blockchain to prevent the target texture data from being tampered. The blockchain is formed by a plurality of blocks, as shown in FIG. 3A. A genesis block includes a block header and a block body. The block header stores an input information eigenvalue, a version number, a timestamp, and a difficulty value. The block body stores input information. A next block of the genesis block uses the genesis block as a parent block. The next block also includes a block header and a block body. The block header stores an input information eigenvalue of the current block, a block header eigenvalue of the parent block, a version number, a timestamp, and a difficulty value. The rest is deduced by analogy. In this way, block data stored in each block in the blockchain is associated with block data stored in the parent block, thereby ensuring the security of input information in the blocks. Based on this, an embodiment of uploading the target texture data into the blockchain is described below.

Figure 3B:
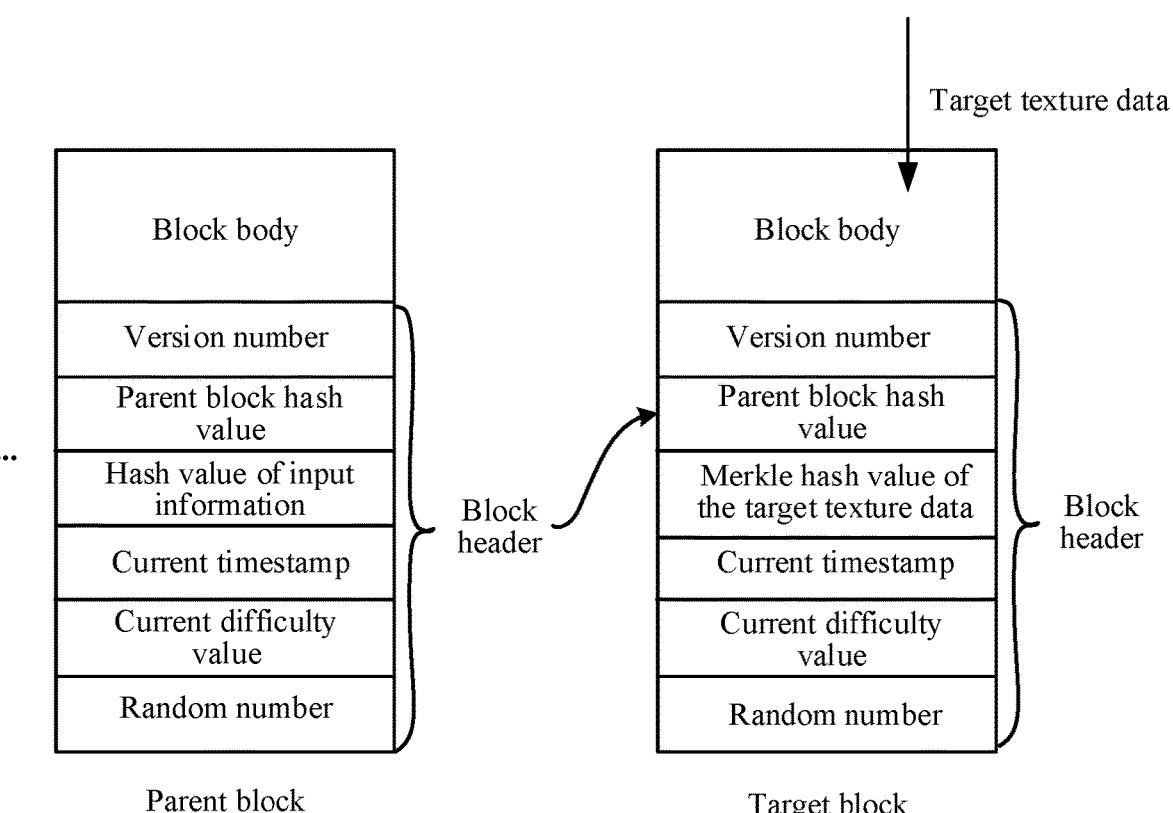
FIG. 3B is a schematic diagram of storing target texture data in a blockchain according to an embodiment of the present disclosure.

When the computer device is located in a blockchain network, the target texture data may be first added to a block body of a target block, and a hash operation is performed on the target texture data in the block body to obtain a Merkle hash value. Next, one random number may be generated by using a random algorithm, and the calculated Merkle hash value, the random number, a version number, a previous block hash value, a current timestamp, and a current difficulty value form a block header of the target block, as shown in FIG. 3B. The version number is version information of a related block protocol in the blockchain. The previous block hash value is an eigenvalue of a block header of a previous block. The current timestamp is a system time at which the block header is formed. The current difficulty value is a difficulty value of calculation. The difficulty value is a fixed value within a fixed time period, and is determined again beyond the fixed time period. Next, one or more hash operations may be performed on content included in the block header by using an eigenvalue algorithm (for example, a SHA256 algorithm) to obtain an eigenvalue of the block header of the target block. A quantity of hash operations may be determined according to a calculation difficulty. When the calculation difficulty is higher, a quantity of hash operations is larger. After the target block is obtained based on the foregoing steps, the target block may be broadcasted to consensus nodes in the blockchain network for consensus processing. After the consensus processing, the target block is added to the blockchain. When the computer device is not located in the blockchain network, the target texture data may be sent to any consensus node in the blockchain network, and the any consensus node performs the foregoing steps to store the target texture data in the blockchain.

In one embodiment, the computer device may further perform cloud storage processing on the target texture data by using a cloud technology. The cloud technology is a hosting technology that unifies a series of resources such as hardware, software, and networks in a wide area network or a local area network to implement computing, storage, processing, and sharing of data. The cloud technology is a general term of a network technology, an information technology, an integration technology, a management platform technology, an application technology, and the like based on cloud computing commercial mode applications, and may form a resource pool for use on demand, which is flexible and convenient. The cloud computing technology becomes an important support. Correspondingly, cloud storage is a new concept extended and developed from the concept of cloud computing. A distributed cloud storage system (referred to as a storage system below) is a storage system that uses functions such as a cluster function, a grid technology, and a distributed storage file system to enable a large number of storage devices (the storage devices are also referred to as storage nodes) of various types in a network to collaborate through application software or an application interface set to jointly provide data storage and service access functions externally.

In the embodiments of the present disclosure, a graphic card shader is introduced, and a plurality of work groups independent of each other are deployed in advance in the graphic card shader. A target compression texture resource obtained by encoding a target image by using a compression texture format includes a plurality of compression texture blocks. After the target compression texture resource of the target image is obtained, one target work group for decoding may be respectively allocated to each compression texture block in the graphic card shader, and each compression texture block is distributed to a corresponding target work group. Next, a received compression texture block may be decoded according to the compression texture format in a manner of invoking target work groups in the graphic card shader in parallel. In such a processing manner, the decoding of a target compression texture resource can be implemented, and parallel decoding of each compression texture block can be implemented, thereby effectively improving the decoding efficiency. In addition, the entire decoding process is implemented by using the graphic card shader, so that the entire decoding process does not require the participation of a CPU. In this way, resources of the CPU can be effectively saved, thereby effectively reducing the resource usage of the CPU and improving the running efficiency of a computer device.

Figure 4:
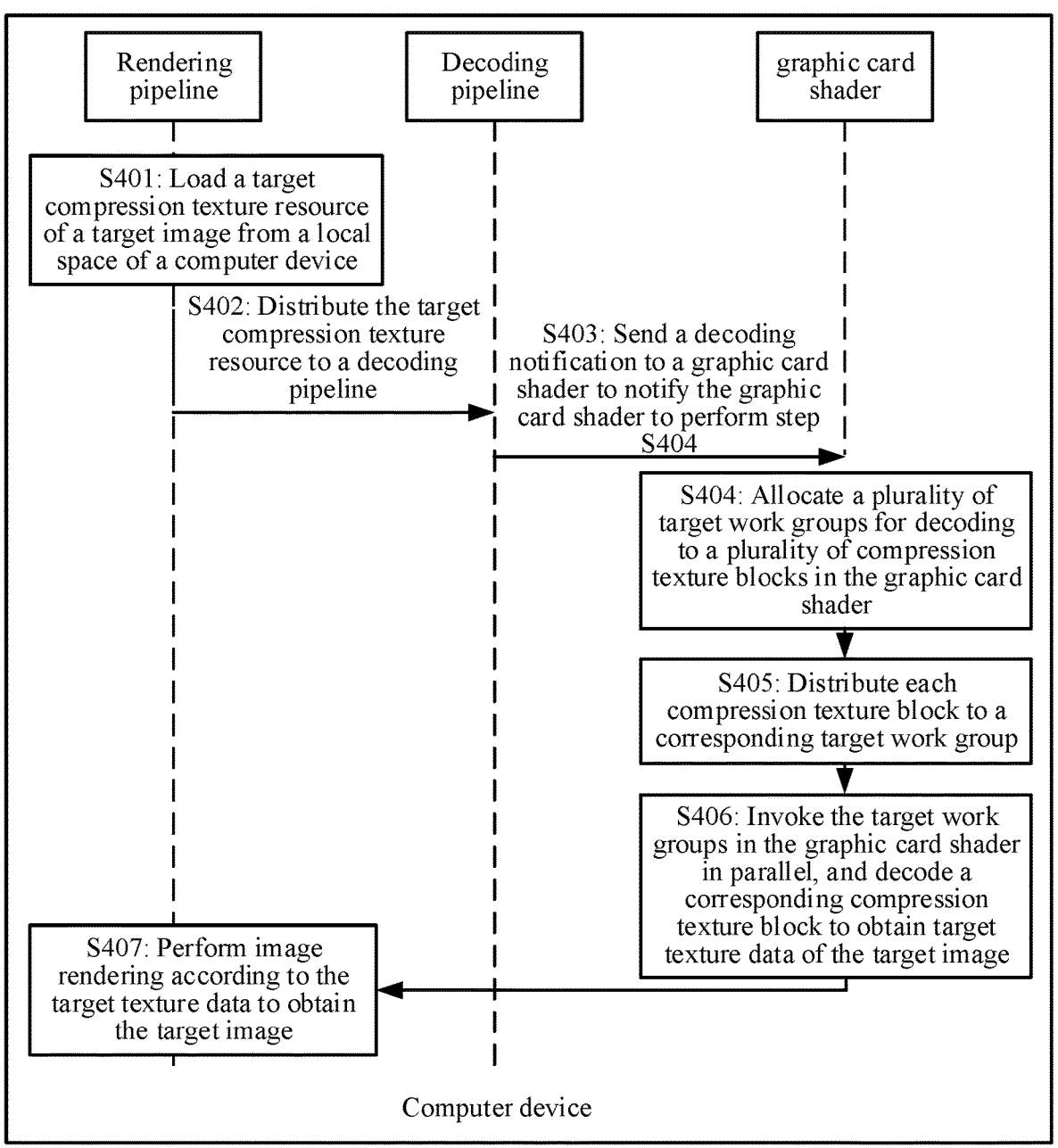
FIG. 4 is a schematic flowchart of an image processing method according to another embodiment of the present disclosure.

FIG. 4 is a schematic flowchart of an image processing method according to another embodiment of the present disclosure. The image processing method may be performed in the computer device discussed above. The computer device may include a rendering pipeline, a decoding pipeline, and a graphic card shader, and the graphic card shader works according to a procedure specified by the decoding pipeline. Referring to FIG. 4, the image processing method may include the following S401 to S407:

S401: Load a target compression texture resource of a target image from a local space of a computer device by using a rendering pipeline.

In one embodiment, the rendering pipeline may load the target compression texture resource of the target image from the local space of the computer device by invoking a texture resource loading interface (for example, glTexCompressedImage2D (an interface for loading a compression texture resource)).

S402: Distribute the target compression texture resource to a decoding pipeline by using the rendering pipeline.

In an embodiment, after successfully loading the target compression texture resource, the rendering pipeline may directly distribute the target compression texture resource to the decoding pipeline. In another embodiment, one graphic card decoding mode (or referred to as a graphic card decoding function) may be set for the computer device. The graphic card decoding mode is a mode of performing decoding by using a graphic card shader. When the graphic card decoding mode is in an on state, it indicates that in this case the graphic card shader supports decoding. When the graphic card decoding mode is in an off state, it indicates that in this case the graphic card shader does not support decoding. In this case, decoding may be performed by using a graphic card driver CPU (refers to as a graphic card driver CPU for short). It can be seen that the graphic card decoding mode is set, so that it can be implemented that a user turns on or off the graphic card decoding mode as required, to flexibly choose whether it is necessary to perform decoding by using the graphic card shader. Based on this, when the computer device is in the graphic card decoding mode, before performing S402, the rendering pipeline may first detect a mode status that the graphic card decoding mode is in by using the rendering pipeline, the mode status including a mode on state or a mode off state. When the mode status is the mode on state, the step of distributing the target compression texture resource to the decoding pipeline by using the rendering pipeline is performed, that is, S402 is performed. When the mode status is the mode off state, a graphic card driver CPU may be invoked by using the rendering pipeline to decode the compression texture blocks in the target compression texture resource to obtain the target texture data of the target image. That is, in this case, after obtaining the target texture data by using the graphic card driver CPU, the rendering pipeline may directly perform S407. That is, in this case, S402 to S406 do not need to be performed.

S403: After the decoding pipeline successfully receives the target compression texture resource, transmit a decoding notification to the graphic card shader through the decoding pipeline, to notify a graphic card shader to perform S404.

S404: Allocate a target work group for decoding to each compression texture block in a plurality of compression texture blocks in the graphic card shader.

It may be understood that one target work group may be allocated to one or more compression texture blocks.

S405: Distribute each compression texture block to a corresponding target work group by using the graphic card shader.

S406: Invoke the target work groups in the graphic card shader in parallel by using the graphic card shader, and decode a corresponding compression texture block to obtain target texture data of the target image, the target texture data including decoded data corresponding to each compression texture block.

S407: Perform image rendering according to the target texture data by using the rendering pipeline to obtain the target image.

As can be seen from the foregoing description, the target texture data may be obtained through decoding in S404 to S406 by the graphic card shader or may be obtained through decoding by invoking the graphic card driver CPU by the rendering pipeline. When the target texture data is obtained through decoding by invoking the graphic card driver CPU by the rendering pipeline, one embodiment of S407 may be: directly invoking, by the rendering pipeline, a rendering interface (for example, glDraw (an interface for image rendering)) to perform image rendering according to the target texture data to obtain the target image. When the target texture data is obtained through decoding by the graphic card shader, for an example embodiment of S407, reference may be made to the following description:

In one embodiment, the rendering pipeline may have a physical first texture video memory space, and the decoding pipeline may have a physical second texture video memory space. The first texture video memory space is a video memory space configured to store data that the rendering pipeline is about to process or data obtained through processing by the rendering pipeline. The second texture video memory space is a video memory space configured to store data that the decoding pipeline is about to process or data obtained through processing by the decoding pipeline. The video memory space is a storage space in a graphic card. In this case, after decoding a received compression texture block, any target work group in the graphic card shader may buffer decoded data obtained through decoding in the second texture video memory space. After the decoded data corresponding to each compression texture block is buffered in the second texture video memory space, that is, the target texture data of the target image is buffered in the second texture video memory space, the decoding pipeline may copy the target texture data of the target image from the second texture video memory space into the first texture video memory space by using a CPU. Alternatively, after the target texture data of the target image is buffered in the second texture video memory space, the decoding pipeline may notify the rendering pipeline, and the rendering pipeline copies the target texture data of the target image from the second texture video memory space into the first texture video memory space by using the CPU. In this case, the embodiment of S407 may be: performing, by the rendering pipeline, image rendering in the first texture video memory space according to the target texture data to obtain the target image.

It has been shown in practice that when the target texture data is copied by using the CPU, a performance loss of 1 ms to 5 ms may be caused. To take full advantage of the decoding pipeline and reduce a performance loss, for a decoding pipeline and a rendering pipeline, the embodiments of the present disclosure provide a sharing manner of using the same physical space and different virtual spaces, so that when the rendering pipeline uses the same physical texture storage space to store a compression texture resource and other data, the decoding pipeline may use the texture storage space to buffer the target texture data obtained through decoding by the graphic card shader. In this way, the performance loss caused when the CPU copies the target texture data can be avoided. Based on this, the embodiments of the present disclosure provide another implementation. For details, reference may be made to the following description:

In another embodiment, the rendering pipeline may have a virtual first graphic card address space, and the decoding pipeline may have a virtual second graphic card address space. Each of the first graphic card address space and the second graphic card address space has a mapping relationship with the same texture storage space. The texture storage space is essentially a physical storage space (that is, a storage space that actually exists). In this case, after any target work group in the graphic card shader decodes the corresponding compression texture block, decoded data obtained through the decoding by the any target work group may be buffered in the texture storage space according to the mapping relationship between the second graphic card address space and the texture storage space. In this case, an embodiment of S407 may be: after decoded data corresponding to the compression texture blocks are all stored in the texture storage space, the rendering pipeline performs, according to the mapping relationship between the first graphic card address space and the texture storage space, image rendering according to the target texture data in the texture storage space to obtain the target image. In some embodiments, to enable the rendering pipeline to perform image rendering in time, after the graphic card shader stores the decoded data corresponding to the compression texture blocks in the texture storage space, the decoding pipeline may send a decoding end notification to the rendering pipeline, to notify the rendering pipeline to perform image rendering in the texture storage space according to the texture data.

A specific manner of mapping the first graphic card address space and the second graphic card address space into the same physical texture storage space is as follows: allocating, by the rendering pipeline, the texture storage space to the target image in a local space of the computer device; mapping, by the rendering pipeline, the first graphic card address space to the texture storage space, and transferring a space identifier (for example, a space address of the texture storage space, and a space sequence number) of the texture storage space to the decoding pipeline; and mapping, the decoding pipeline, the second graphic card address space to the texture storage space according to the space identifier. A time point at which a space mapping operation is performed on the rendering pipeline and the decoding pipeline is not limited in the embodiments of the present disclosure. For example, in a process of loading the target compression texture resource of the target image, the rendering pipeline may perform allocation and space mapping operations on the texture storage space, or may perform allocation and mapping operations on the texture storage space before or after the target compression texture resource is loaded. In another example, the decoding pipeline may perform the space mapping operation immediately after receiving the space identifier transferred by the rendering pipeline; or may perform the space mapping operation after receiving the target compression texture resource distributed by the rendering pipeline. Further, the space identifier and the target compression texture resource may be sent to the decoding pipeline by the rendering pipeline simultaneously or may be sent to the decoding pipeline separately. This is not limited herein.

Figure 5:
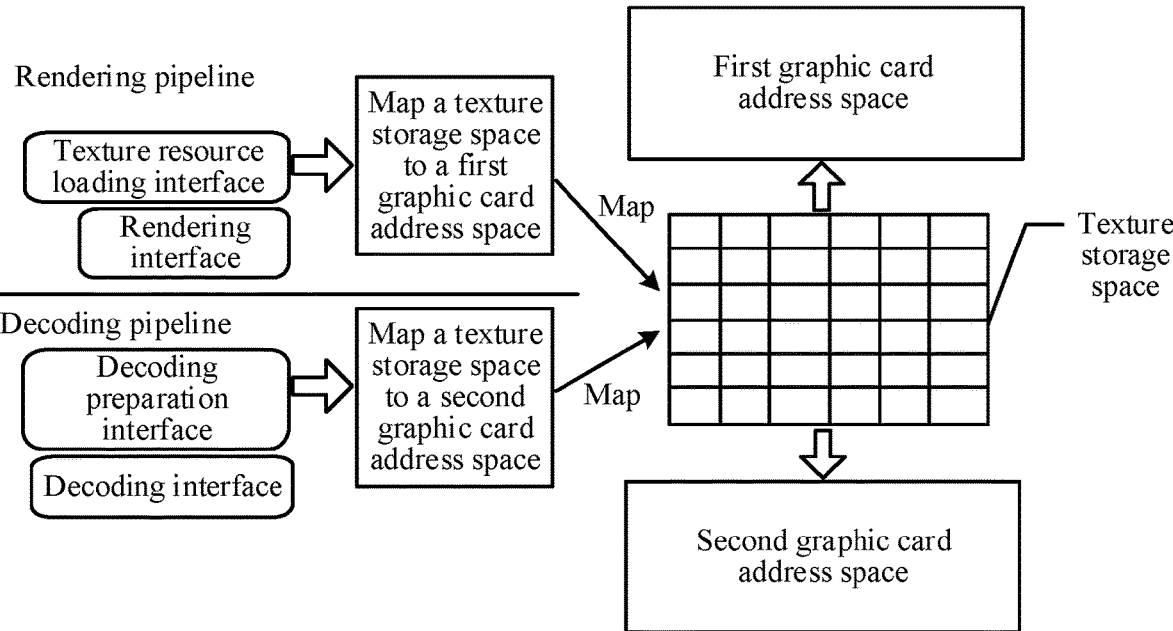
FIG. 5 is a schematic diagram of space mapping according to an embodiment of the present disclosure.

A specific manner of mapping the first graphic card address space and the second graphic card address space into the same physical texture storage space is further schematically described below with reference to the schematic diagram of space mapping shown in FIG. 5. Referring to FIG. 5, the rendering pipeline may allocate a texture storage space (physical pages) in a process of loading the target compression texture resource of the target image by using glTexCompressedImage2D (an interface for loading a compression texture resource), and map the texture storage space to the first graphic card address space of the rendering pipeline; and send the space identifier of the texture storage space to the decoding pipeline, to trigger the decoding pipeline to decode the target compression texture resource into the texture storage space. The decoding pipeline may receive the space identifier sent by the rendering pipeline, and map the texture storage space indicated by the space identifier to the second graphic card address space of the decoding pipeline by using astc_cs_decode (a decoding preparation interface).

In one embodiment, when all or some compression texture blocks in the target compression texture resource fail to be decoded by the graphic card shader, invoking a graphic card driver CPU to decode the compression texture blocks in the target compression texture resource to obtain the target texture data of the target image.

In the embodiments of the present disclosure, the entire decoding process is implemented by using the graphic card shader, so that the entire decoding process does not require the participation of a CPU. In this way, resources of the CPU can be effectively saved, thereby effectively reducing the resource usage of the CPU and improving the running efficiency of a computer device. Further, a corresponding compression texture block can be decoded in a manner of invoking target work groups in the graphic card shader in parallel, so that the decoding efficiency can be effectively improved. In addition, in a manner in which the decoding pipeline and the rendering pipeline share the same physical texture storage space, a performance loss caused by copying data by a CPU can be effectively reduced, the timeliness of image rendering can be improved, the processing efficiency of the entire image processing process can be improved.

In the foregoing method embodiment shown in FIG. 4, when the target image is a target game picture image in a target game, the target game usually has a game resource package. The game resource package is used for storing various data resources required in a running process of the target game. Therefore, after encoding various game picture images in the target game by using the compression texture format to obtain the compression texture resources of the game picture images, a game developer may perform offline decoding on the compression texture resource of one or more game pictures in the target game in advance, construct an offline decoded data set of the target game by using the texture data obtained through decoding and image identifiers of the corresponding game picture images, and add the offline decoded data set to the game resource package of the target game.

In this case, before performing S402, the rendering pipeline may first obtain the offline decoded data set of the target game. In a first embodiment, the offline decoded data set of the target game may be obtained from the game resource package of the target game. The offline decoded data set includes an image identifier of one or more game picture images in the target game and texture data associated with each image identifier. Texture data associated with any image identifier is obtained by performing offline decoding on a compression texture resource of a game picture image indicated by the any image identifier. Next, the rendering pipeline performs identifier hitting on the image identifier in the offline decoded data set according to an image identifier of the target image, to detect whether the offline decoded data set includes target texture data of the target game picture image. When a hit fails, the rendering pipeline performs S402. When a hit succeeds, texture data associated with the hit image identifier is loaded from the offline decoded data set by using the rendering pipeline, and the loaded texture data is used as the target texture data of the target image. In this way, a duration of obtaining the target texture data can be effectively reduced, thereby improving the decoding efficiency.

In one embodiment, as can be seen from the foregoing related description of S402, before performing S402, the rendering pipeline may first perform the step of detecting a mode status that the graphic card decoding mode is in. In this case, the rendering pipeline may perform the operation of identifier hitting before or after the mode status that the graphic card decoding mode is in is detected. For example, the operation of identifier hitting is performed before the mode status that the graphic card decoding mode is in is detected, and a processing logic of the rendering pipeline is as follows: performing, by the rendering pipeline, identifier hitting on the image identifier in the offline decoded data set according to an image identifier of the target image; when a hit fails, performing, by the rendering pipeline, the step of detecting a mode status that the graphic card decoding mode is in; and when a hit succeeds, loading, by the rendering pipeline, texture data associated with the hit image identifier from the offline decoded data set, and using the loaded texture data as the target texture data of the target image.

As can be seen from the foregoing description, in an image processing process, the rendering pipeline may invoke a graphic card driver CPU to decode the compression texture blocks in the target compression texture resource. For example, after detecting that the mode status that the graphic card decoding mode is in is the mode off state, the rendering pipeline may invoke the graphic card driver CPU to decode the compression texture blocks in the target compression texture resource. In another example, when all or some compression texture blocks in the target compression texture resource fail to be decoded by the graphic card shader, the rendering pipeline may invoke the graphic card driver CPU to decode the compression texture blocks in the target compression texture resource. Further, it is taken into consideration that the graphic card driver CPU may have a decoding capability of decoding the target compression texture resource or may not have the decoding capability. When the graphic card driver CPU does not have the decoding capability and the graphic card driver CPU is still invoked to decode the target compression texture resource, the target compression texture resource fails to be decoded. Therefore, when the graphic card driver CPU does not have the decoding capability, the rendering pipeline may directly invoke a game engine CPU of the target game to decode the target compression texture resource. In such a processing manner, in one aspect, it can be ensured that the target compression texture resource is successfully decoded to ensure that the target image is successfully rendered and displayed. In another aspect, the problem of a waste of processing resources caused when the graphic card driver CPU performs useless decoding can be avoided.

Based on this, before invoking the graphic card driver CPU to decode the compression texture blocks in the target compression texture resource, the rendering pipeline may further detect a decoding capability related to the target compression texture resource of the graphic card driver CPU. In response to detecting that the graphic card driver CPU has the decoding capability, the step of invoking a graphic card driver CPU by using the rendering pipeline to decode the compression texture blocks in the target compression texture resource is performed. In response to detecting that the graphic card driver CPU does not have the decoding capability, a game engine CPU of the target game is invoked by using the rendering pipeline to decode the compression texture blocks in the target compression texture resource to obtain the target texture data of the target image. A specific time point at which the rendering pipeline detects a decoding capability related to the target compression texture resource of the graphic card driver CPU is not limited in the embodiments of the present disclosure. For example, in other embodiments, the rendering pipeline may perform the step of detecting a decoding capability before obtaining the offline decoded data set of the target game. In this case, the processing logic of the rendering pipeline is as follows: detecting a decoding capability related to the target compression texture resource of the graphic card driver CPU; in response to detecting that the graphic card driver CPU has the decoding capability, performing, by the rendering pipeline, the step of obtaining an offline decoded data set of the target game; and in response to detecting that the graphic card driver CPU does not have the decoding capability, invoking, by the rendering pipeline, a game engine CPU of the target game to decode the compression texture blocks in the target compression texture resource to obtain the target texture data of the target image.

The target game discussed above may be a terminal game or a cloud game. The terminal game is a game that is directly run in a game client installed on a terminal device used by a player user. The cloud game may also be referred to as gaming on demand, and is a gaming mode based on cloud computing. The cloud computing is a computing mode based on the Internet. In a scenario of a cloud game, the game is run in a cloud game server instead of a game client of a player user. The cloud game server encodes game pictures in a game scene into a video stream and transmits the video stream to the game client of the player user over a network for playing. When the target game is a terminal game, the computer device discussed above is a terminal device used by a player user. When the target game is a cloud game, the computer device discussed above is a cloud game server running the cloud game.

Figure 6A:
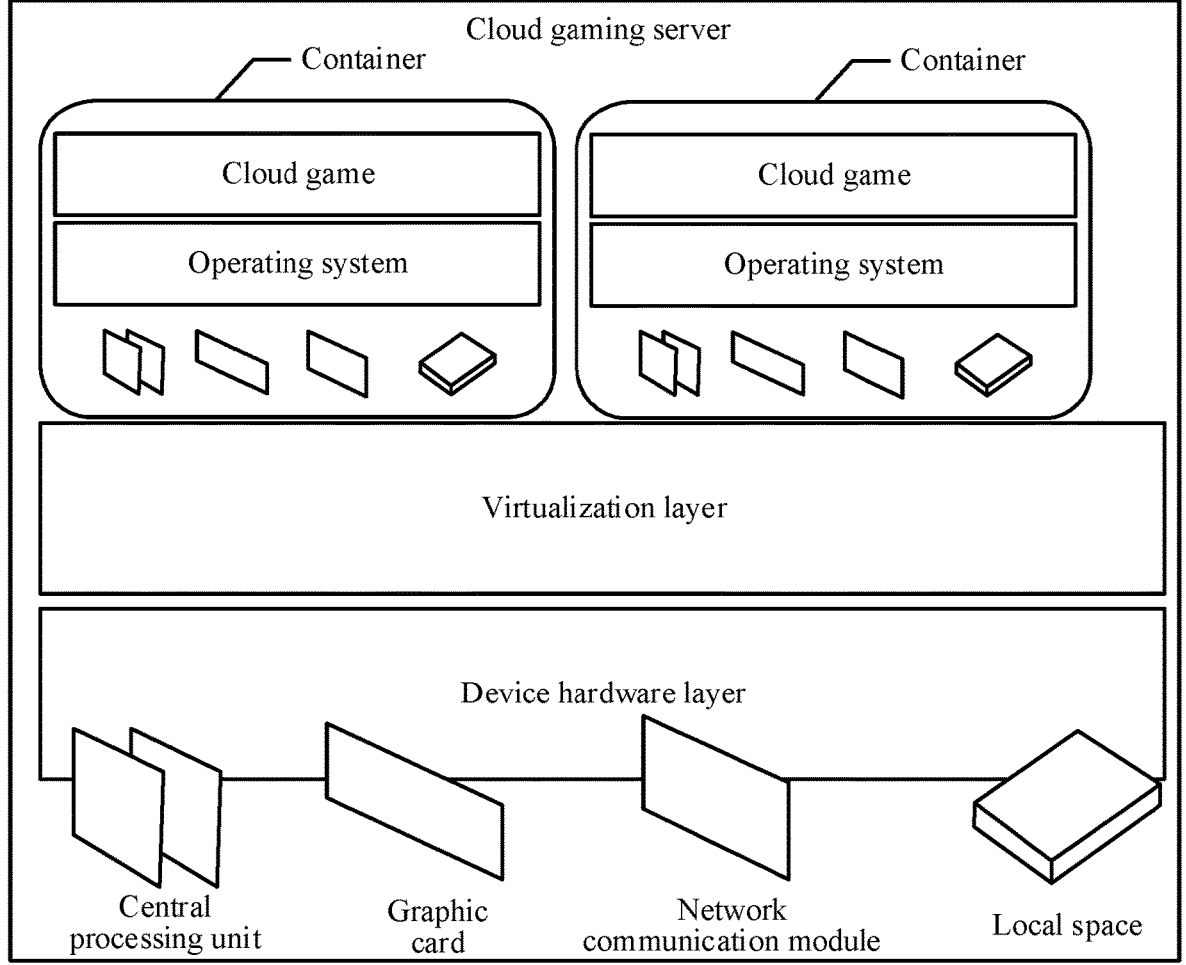
FIG. 6A is a schematic structural diagram of a cloud game server according to an embodiment of the present disclosure.

Referring to FIG. 6A, the cloud game server may include a device hardware layer, a virtualization layer (Hypervisor), one or more containers, and the like. The device hardware layer may include, but not limited to, a CPU, a graphic card, a network communication module, a local space for storage, and the like. The graphic card may include a graphic card shader, a decoding pipeline, a rendering pipeline, and the like. The virtualization layer is mainly configured to implement in a software manner a virtual environment identical to a physical host environment. The cloud game server may deploy and run the one or more containers through the virtualization layer. The container is a type of virtualization on an operating system level and is configured to carry an operating system. Each container may be connected to one or more game clients, and each container may be configured to run one or more cloud games. In a process of running any cloud game, each container may transmit game pictures of the any cloud game to the connected game client for display.

Figure 6B:
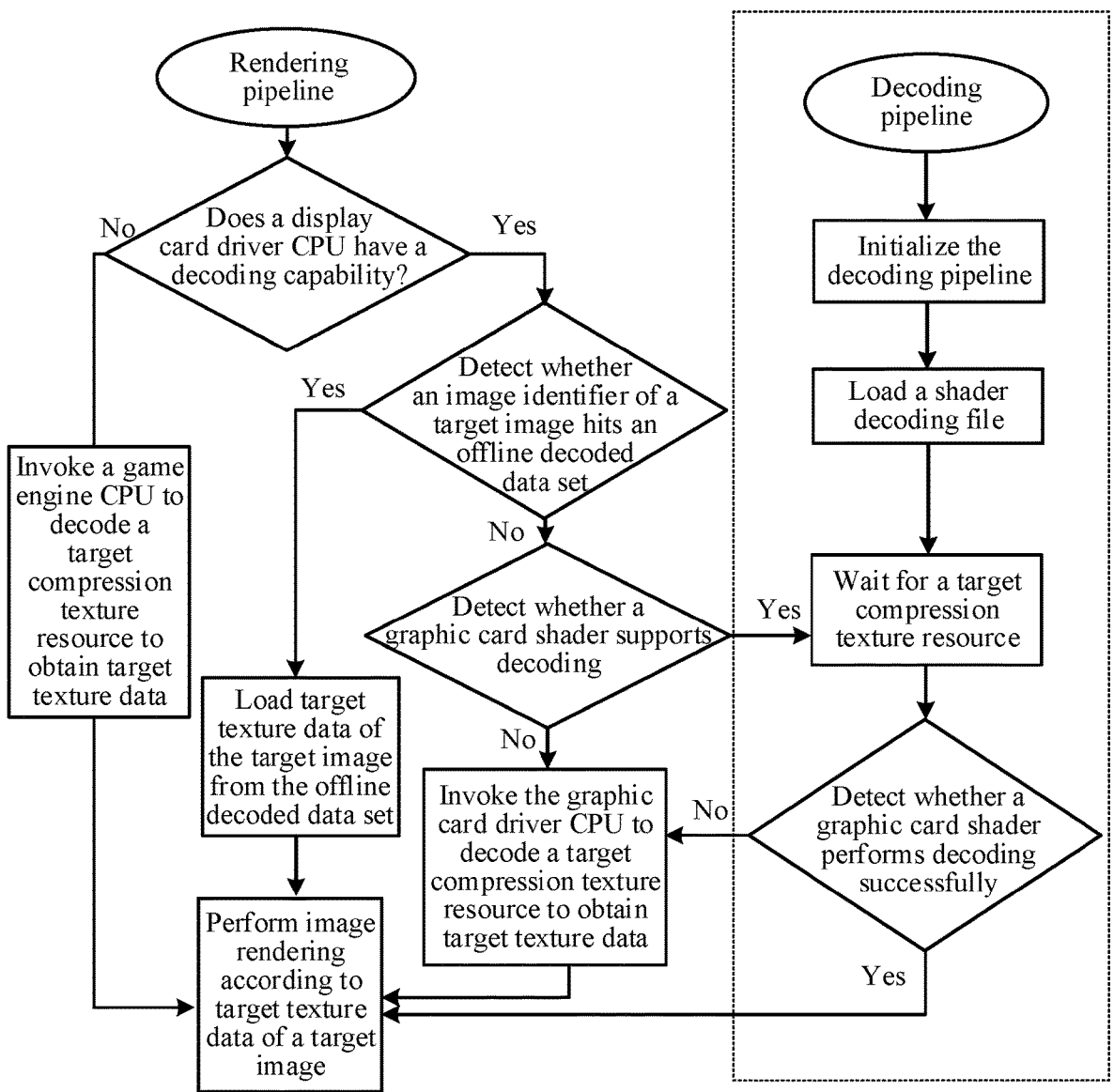
FIG. 6B is a schematic flowchart of an image processing method according to another embodiment of the present disclosure.

Based on the foregoing description, the embodiments of the present disclosure further provide an image processing method shown in FIG. 6B. In the embodiments of the present disclosure, an example in which the target game is a cloud game, that is, the computer device is a cloud game server is mainly used for description. That is, the image processing method shown in FIG. 6B may be performed on the cloud game server, and specifically may be performed in a graphic card in the cloud game server. Referring to FIG. 6B, an approximate procedure of the image processing method is as follows:

First, a decoding pipeline may be initialized (created). For example, an independent thread may be created in an initialization process of a target game, and the decoding pipeline is initialized by using the independent thread. Next, a shader decoding file may be loaded, and a graphic card shader creates a decoding manager. The decoding manager is configured to wait and receive a target compression texture resource of a target image.

After a rendering pipeline has loaded the target compression texture resource, it may be detected whether a graphic card driver CPU has a decoding capability. When the graphic card driver CPU does not have a decoding capability, the rendering pipeline invokes a game engine CPU to decode the target compression texture resource to obtain target texture data of the target image. When the graphic card driver CPU has a decoding capability, the rendering pipeline may further detect whether an image identifier of the target image hits an offline decoded data set, to detect whether the offline decoded data set includes target texture data of a target game picture image. When the offline decoded data set is successfully hit, the rendering pipeline loads the target texture data of the target image from the offline decoded data set. When the offline decoded data set is not successfully hit, the rendering pipeline may detect a mode status of a graphic card decoding mode, to detect whether the graphic card shader supports decoding. In response to detecting that the graphic card shader does not support decoding, the rendering pipeline invokes the graphic card driver CPU to decode the target compression texture resource to obtain target texture data of the target image. In response to detecting that the graphic card shader does not support decoding, the rendering pipeline distributes the target compression texture resource of the target image to the decoding pipeline.

Correspondingly, after receiving the target compression texture resource distributed by the rendering pipeline, the decoding pipeline may send the target compression texture resource to the graphic card shader through the decoding manager, and notify the graphic card shader to decode the target compression texture resource. For example, the graphic card shader may respectively allocate target work groups for decoding to the compression texture blocks in the target compression texture resource, and distribute each compression texture block to a corresponding target work group. Next, the target work groups in the graphic card shader is invoked in parallel, and a received compression texture block is decoded to obtain target texture data of the target image. The decoding pipeline may detect in real time or periodically whether the graphic card shader has succeeded in decoding; and when the decoding succeeds, notify the rendering pipeline to perform image rendering according to the target texture data of the target image; or when the decoding fails, notify the rendering pipeline to decode the target compression texture resource by using the graphic card driver CPU, and after the target texture data is obtained through decoding, perform image rendering according to the target texture data of the target image.

Figure 7:
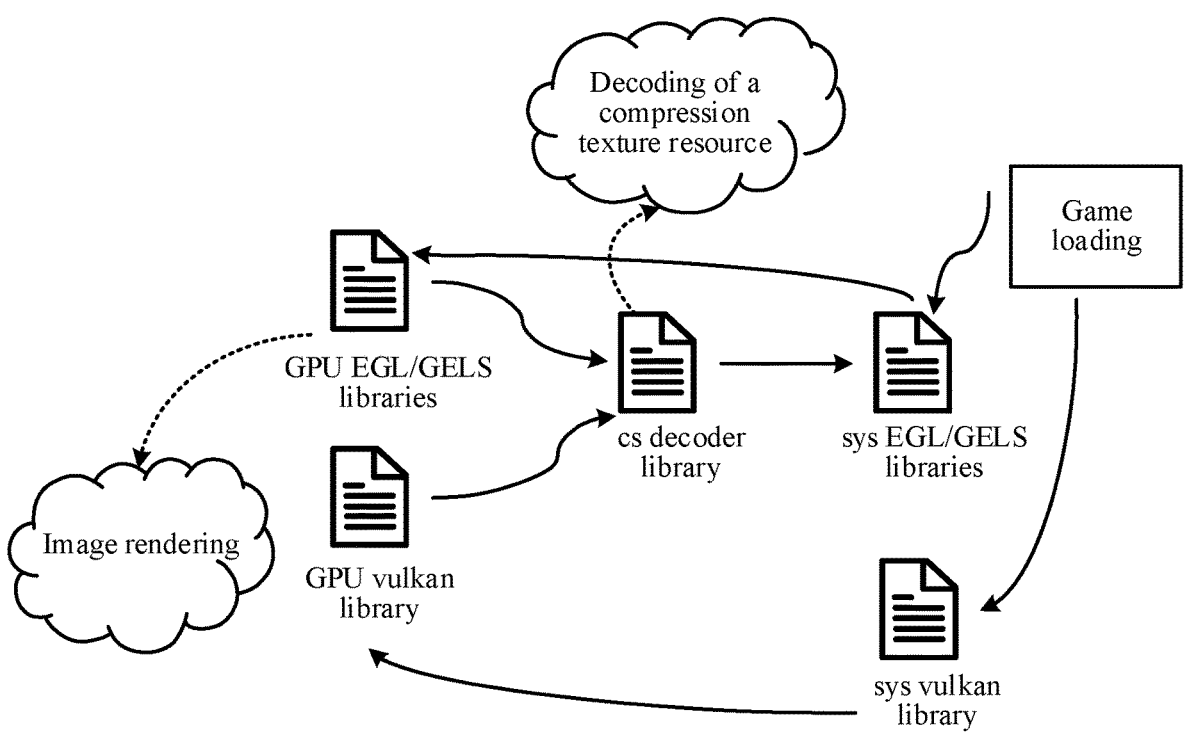
FIG. 7 is a schematic diagram of invoking a software development kit (SDK) according to an embodiment of the present disclosure.

For the related description of the foregoing method embodiments shown in FIG. 2, FIG. 4, and FIG. 6B, the following two points need to be described:

1) In the embodiments of the present disclosure, a decoding procedure performed by the graphic card shader in the foregoing method embodiments shown in FIG. 2, FIG. 4, and FIG. 6B is encapsulated in a manner of independent encapsulation into an SDK. That is, the decoding procedure performed by the graphic card shader may be independently encapsulated in one SDK (which may be named a cs decoder library), to perform decoding by invoking the SDK when a compression texture resource of any image needs to be decoded. For a schematic diagram of the principle of invoking the SDK, reference may be made to FIG. 7: After the target game is loaded, a sys vulkan library (a system vulkan rendering interface) may be first invoked. Next, a GPU vulkan library (a GPU vulkan rendering interface) may be invoked by using the sys vulkan library, and then the cs decoder library may be decoded by using the GPU vulkan library to implement decoding. Alternatively, sys EGL/ GELS libraries (a system EGL/GELS rendering interface) may be first invoked. Next, GPU EGL/GELS libraries (a GPU EGL/GELS rendering interface) may be invoked by using the sys EGL/GELS libraries, and then the cs decoder library may be invoked by using the GPU EGL/GELS libraries to implement decoding.

vulkan discussed above is a cross-platform 2D and 3D drawing application interface. GELS is short for OpenGL ES (OpenGL for Embedded Systems), and is a subset of a 3D graphic API of OpenGL (a cross-language, cross-platform application programming interface for rendering 2D and 3D graphics). EGL is an intermediate interface layer between the OpenGL Establish rendering interface and a native platform window system. The manner of independent encapsulation of an SDK may have the following beneficial effects: (1) A potential rendering risk introduced by excessive modifications to a graphic card driver is avoided. (2) The independence from the rendering pipeline avoids damage to a rendering state machine of a game. (3) The graphic card shader supports an openGLES rendering interface and a vulkan rendering interface in the graphic card driver to avoid reinventing the wheel.

2) In summary, when the target image is a target game picture image in a target game, the embodiments of the present disclosure may provide the following decoding manners for a target compression resource of the target image: (1) decoding through a game engine CPU; (2) decoding through a graphic card driver CPU; (3) decoding through a graphic card shader; and (4) decoding through an offline decoded data set. The essence of both the decoding manner (1) and the decoding manner (2) is decoding through a CPU. In the embodiments of the present disclosure, decoding durations required for the CPU decoding, the decoding through an offline decoded data set, and the decoding through a graphic card shader are tested by using compression texture resources of different sizes in an ASTC format. For test results, reference may be made to the following Table 1:

TABLE 1

| Size of a compression texture resource (a compression resource block being 6 × 6) | CPU | Offline decoded data set | Graphic card shader |
|---|---|---|---|
| 256 × 256 | 3 ms | 0 ms | 1 ms |
| 512 × 2512 | 12 ms | 0 ms | 2 ms |
| 1024 × 1024 | 50 ms | 2 ms | 5 ms |
| 2048 × 2048 | 79 ms | 2 ms | 9 ms |

"ms" in Table 1 represents millisecond. As can be seen from Table 1, the decoding manner of the decoding through an offline decoded data set requires the shortest decoding duration and has the best decoding performance. The decoding duration required for the decoding manner of the decoding through a graphic card shader is much shorter than the decoding duration required for the decoding manner of the decoding through a CPU. That is, the decoding performance of the decoding manner of the decoding through a graphic card shader is better than the decoding performance of the decoding manner of the decoding through a CPU.

In the embodiments of the present disclosure, a target compression texture resource in a compression texture format in a target game can be quickly decoded in real time by using strong floating point operation and parallel computing capabilities of a graphic card in a cloud game server, thereby implementing quick rendering and display of a target image. In this way, the smoothness of gaming can be effectively improved, the CPU resource usage can be reduced, problems of game freezes and low frame rates caused by excessively slow CPU decoding can be resolved, and the operation cost problem of a limited number of concurrent game paths caused by excessive CPU resources occupied by a game on a single path of a cloud game server can be resolved. In addition, the entire decoding process is performed in the cloud game server, so that the entire decoding process is not limited by a terminal type and an operating system and may be effective on all terminals. In addition, because the embodiments of the present disclosure support the decoding of a target compression texture resource by a graphic card shader, a game developer does not need to specially make modifications and adaptations to the implementation logic of a cloud game to create an offline decoded data set satisfying a decoding condition of the cloud game server, thereby achieving high applicability and compatibility. Moreover, the problem of excessive use of memory for storing a game resource package of a cloud game caused by offline decoding of compression texture resources of game picture images can be resolved.

Figure 8:
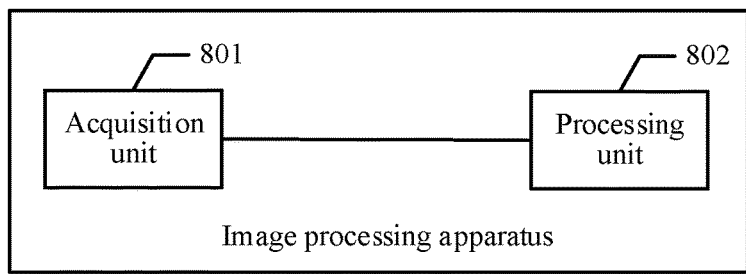
FIG. 8 is a schematic structural diagram of an image processing apparatus according to an embodiment of the present disclosure.

Based on the description of the embodiments of the foregoing image processing method, an image processing apparatus is further disclosed in the embodiments of the present disclosure. The image processing apparatus may be a computer program (including program code) running on a computer device. The image processing apparatus may perform the method shown in FIG. 2, FIG. 4 or FIG. 6B. Referring to FIG. 8, the image processing apparatus may run the following units:

an obtaining unit 801, configured to obtain a target compression texture resource of a target image, the target compression texture resource being obtained by encoding the target image by using a compression texture format, the target compression texture resource including a plurality of compression texture blocks; and a processing unit 802, configured to: allocate a plurality of target work groups for decoding to the plurality of compression texture blocks in a graphic card shader, and distribute each compression texture block to a corresponding target work group, the processing unit 802 being further configured to: invoke the target work groups in the graphic card shader in parallel, and decode a received compression texture block according to the compression texture format to obtain target texture data of the target image, the target texture data including decoded data corresponding to each compression texture block.

In an embodiment, each work group is a sub-processing unit with a decoding capability in the graphic card shader, and the work groups are independent of each other; and any target work group decodes the received compression texture block by using an algorithm instruction used for decoding the target compression texture resource.

In an embodiment, the graphic card shader is disposed in the computer device, the computer device further includes a rendering pipeline and a decoding pipeline, and the graphic card shader works according to a procedure specified in the decoding pipeline; and correspondingly, the processing unit 802 may be further configured to:

perform image rendering according to the target texture data by using the rendering pipeline to obtain the target image.

In another embodiment, the rendering pipeline includes a virtual first graphic card address space, and the decoding pipeline includes a virtual second graphic card address space; and each of the first graphic card address space and the second graphic card address space has a mapping relationship with the same texture storage space.

In another embodiment, the processing unit 802 may be further configured to: after any target work group in the graphic card shader decodes the received compression texture block, buffer, in the texture storage space according to the mapping relationship between the second graphic card address space and the texture storage space, decoded data obtained through the decoding by the any target work group; and correspondingly, when being configured to perform image rendering according to the target texture data by using the rendering pipeline to obtain the target image, the processing unit 802 may be further configured to:

after decoded data corresponding to the compression texture blocks are all stored in the texture storage space, perform, according to the mapping relationship between the first graphic card address space and the texture storage space, image rendering according to the target texture data in the texture storage space by using the rendering pipeline to obtain the target image.

In another embodiment, the processing unit 802 may be further configured to:

allocate the texture storage space to the target image in a local space of the computer device by using the rendering pipeline;

map the first graphic card address space to the texture storage space by using the rendering pipeline, and transfer a space identifier of the texture storage space to the decoding pipeline; and map the second graphic card address space to the texture storage space by using the decoding pipeline according to the space identifier.

In another embodiment, when being configured to obtain a target compression texture resource of a target image, the obtaining unit 801 may be further configured to: load the target compression texture resource of the target image from a local space of the computer device by using the rendering pipeline; and correspondingly, the processing unit 802 may be further configured to:

distribute the target compression texture resource to the decoding pipeline by using the rendering pipeline; and after the decoding pipeline successfully receives the target compression texture resource, transmit a decoding notification to the graphic card shader through the decoding pipeline, to notify the graphic card shader to perform the step of allocating a plurality of target work groups for decoding to the plurality of compression texture blocks in a graphic card shader.

In another embodiment, the computer device has a graphic card decoding mode, and the graphic card decoding mode is a mode of performing decoding by using the graphic card shader; and correspondingly, the processing unit 802 may be further configured to:

detect a mode status that the graphic card decoding mode is in by using the rendering pipeline, the mode status including a mode on state or a mode off state;

when the mode status is the mode on state, perform the step of distributing the target compression texture resource to the decoding pipeline by using the rendering pipeline; and when the mode status is the mode off state, invoke a graphic card driver CPU by using the rendering pipeline to decode the compression texture blocks in the target compression texture resource to obtain the target texture data of the target image.

In another embodiment, the target image is a target game picture image in a target game; and correspondingly, the processing unit 802 may be further configured to:

obtain an offline decoded data set of the target game by using the rendering pipeline, the offline decoded data set including an image identifier of one or more game picture images in the target game and texture data associated with each image identifier, texture data associated with any image identifier being obtained by performing offline decoding on a compression texture resource of a game picture image indicated by the any image identifier;

perform identifier hitting on the image identifier in the offline decoded data set by using the rendering pipeline according to an image identifier of the target image;

when a hit fails, perform the step of detecting a mode status that the graphic card decoding mode is in by using the rendering pipeline; and when a hit succeeds, load texture data associated with the hit image identifier from the offline decoded data set by using the rendering pipeline, and use the loaded texture data as the target texture data of the target image.

In an embodiment, the step of allocating a plurality of target work groups for decoding to the plurality of compression texture blocks in a graphic card shader is performed when the image identifier of the target image does not exist in the offline decoded data set; and when the image identifier of the target image exists in the offline decoded data set, the target texture data of the target image is loaded from the offline decoded data set.

In another embodiment, the processing unit 802 may be further configured to:

detect a decoding capability related to the target compression texture resource of the graphic card driver CPU by using the rendering pipeline;

in response to detecting that the graphic card driver CPU has the decoding capability, perform the step of obtaining an offline decoded data set of the target game by using the rendering pipeline; and in response to detecting that the graphic card driver CPU does not have the decoding capability, invoke a game engine CPU of the target game by using the rendering pipeline to decode the compression texture blocks in the target compression texture resource to obtain the target texture data of the target image.

In another embodiment, the processing unit 802 may be further configured to:

when all or some compression texture blocks in the target compression texture resource fail to be decoded by the graphic card shader, invoke a graphic card driver CPU to decode the compression texture blocks in the target compression texture resource to obtain the target texture data of the target image.

In another embodiment, the graphic card shader includes M work groups, M being an integer greater than 1; and correspondingly, when being configured to allocate a plurality of target work groups for decoding to a plurality of compression texture blocks in a graphic card shader, the processing unit 802 may be further configured to:

traverse the plurality of compression texture blocks, and determine current compression texture block being traversed currently;

when an unallocated remaining work group exists in the M work groups in the graphic card shader, allocate one target work group for decoding to the current compression texture block from the remaining work group; and when all the work groups in the M work groups have been allocated to compression texture blocks, allocate one target work group for decoding to the current compression texture block from the M work groups.

In another embodiment, a decoding procedure performed by the graphic card shader is independently encapsulated in one SDK, to perform decoding by invoking the SDK when a compression texture resource of any image needs to be decoded.

According to another embodiment of the present disclosure, units in the image processing apparatus shown in FIG. 8 may be separately or wholly combined into one or several other units, or one (or more) of the units herein may further be divided into multiple units of smaller functions. In this way, same operations can be implemented, and implementation of the technical effects of the embodiments of the present disclosure is not affected. The foregoing units are divided based on logical functions. In an actual application, a function of one unit may be implemented by a plurality of units, or functions of a plurality of units are implemented by one unit. In other embodiments of the present disclosure, the image processing apparatus may include other units. During actual application, the functions may be cooperatively implemented by other units and may be cooperatively implemented by a plurality of units.

According to another embodiment of the present disclosure, a computer program (including program code) that can perform the steps in the corresponding method shown in FIG. 2 may run on a general computing device, such as a computer, which include processing elements and storage elements such as a CPU, a random access memory (RAM), and a read-only memory (ROM), to construct the image processing apparatus shown in FIG. 8, and implement the image processing method in the embodiments of the present disclosure. The computer program may be recorded in, for example, a computer readable recording medium, and may be loaded into the foregoing computing device by using the computer readable recording medium, and run in the computing device.

In the embodiments of the present disclosure, a graphic card shader is introduced, and a plurality of work groups independent of each other are deployed in advance in the graphic card shader. A target compression texture resource obtained by encoding a target image by using a compression texture format includes a plurality of compression texture blocks. After the target compression texture resource of the target image is obtained, one target work group for decoding may be respectively allocated to each compression texture block in the graphic card shader, and each compression texture block is distributed to a corresponding target work group. Next, a received compression texture block may be decoded according to the compression texture format in a manner of invoking target work groups in the graphic card shader in parallel. In such a processing manner, the decoding of a target compression texture resource can be implemented, and parallel decoding of each compression texture block can be implemented, thereby effectively improving the decoding efficiency. In addition, the entire decoding process is implemented by using the graphic card shader, so that the entire decoding process does not require the participation of a CPU. In this way, resources of the CPU can be effectively saved, thereby effectively reducing the resource usage of the CPU and improving the running efficiency of a computer device.

Figure 9:
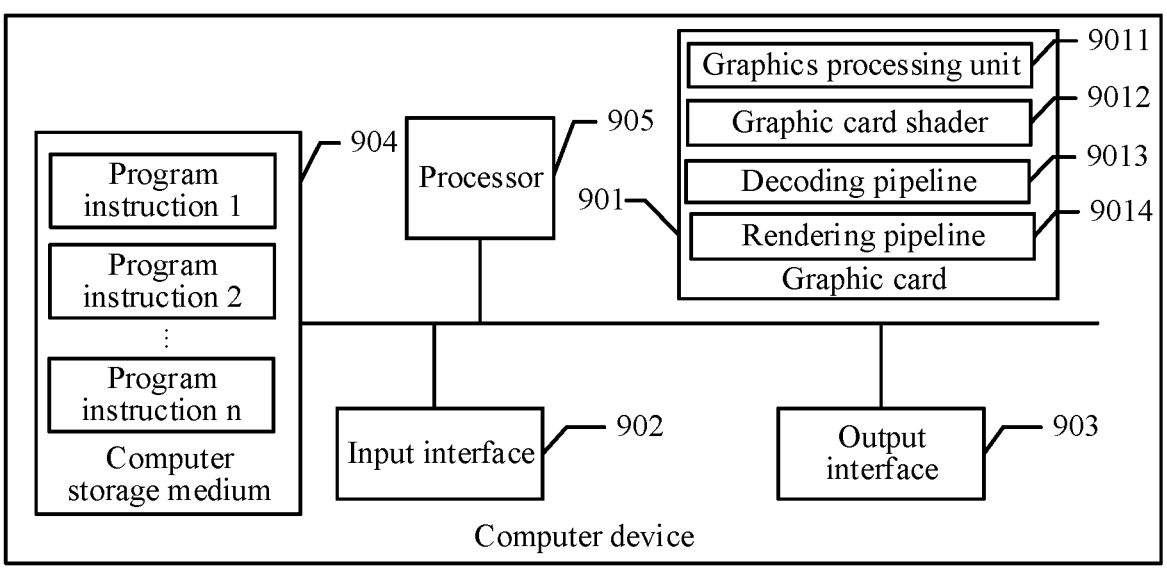
FIG. 9 is a schematic structural diagram of a computer device according to an embodiment of the present disclosure.

Based on the descriptions of the foregoing method embodiments and apparatus embodiments, the embodiments of the present disclosure further provide a computer device. Referring to FIG. 9, the computer device at least includes a graphic card 901, an input interface 902, an output interface 903, and a computer storage medium 904. The graphic card 901, the input interface 902, the output interface 903, and the computer storage medium 904 in the computer device may be connected by a bus or in another manner. The graphic card 901 may further include a GPU 9011, a graphic card shader 9012, a decoding pipeline 9013, a rendering pipeline 9014. The computer storage medium 904 may be stored in a memory of the computer device. The computer storage medium 904 is configured to store a computer program. The computer program includes program instructions. The processor 901 is configured to execute the program instructions stored in the computer storage medium 904. Further, the computer device may further include a CPU 905. The CPU 905 is a computing core and a control core of the computer device, is suitable for implementing one or more instructions, and is specifically suitable for loading and executing one or more instructions to implement a corresponding method procedure or a corresponding function.

In an embodiment, the graphic card 901 in the embodiments of the present disclosure may be configured to perform a series of image processing, specifically including: obtaining a target compression texture resource of a target image, the target compression texture resource being obtained by encoding the target image by using a compression texture format, the target compression texture resource including a plurality of compression texture blocks; allocating a plurality of target work groups for decoding to the plurality of compression texture blocks in a graphic card shader, and distributing each compression texture block to a corresponding target work group; and invoking the target work groups in the graphic card shader in parallel, and decoding a received compression texture block according to the compression texture format to obtain target texture data of the target image, the target texture data including decoded data corresponding to each compression texture block, and the like.

The embodiments of the present disclosure further provide a computer storage medium, and the computer storage medium is a memory device in a computer device and is configured to store programs and data. It may be understood that the computer storage medium herein may include an internal storage medium of the computer device and certainly may also include an extended storage medium supported by the computer device. The computer storage medium provides storage space, and the storage space stores an operating system of the computer device. In addition, the storage space further stores one more programs instructions suitable for being loaded and executed by the graphic card 901. The instructions may be one or more computer programs (including program code). The computer storage medium herein may be a high-speed RAM or a non-volatile memory, for example, at least one magnetic disk memory. In some embodiments, the computer storage medium may further be at least one computer storage medium located away from the foregoing processor.

In an embodiment, the graphic card 901 may load and execute one or more instructions stored in the computer storage medium to implement corresponding steps in the method in the embodiment of the foregoing image processing method shown in FIG. 2, FIG. 4 or FIG. 6B. During implementation, the one or more instructions stored in the computer storage medium are loaded by the graphic card 901 to perform the image processing method provided in the embodiments of the present disclosure.

According to an aspect of the present disclosure, a computer program product or a computer program is further provided, the computer program product or the computer program including computer instructions, the computer instructions being stored in a computer-readable storage medium. A processor of a computer device reads the computer instructions from the computer-readable storage medium, and executes the computer instructions to cause the computer device to perform the methods provided in the various example manners in the embodiment aspects of the foregoing image processing method shown in FIG. 2, FIG. 4 or FIG. 6B.

In addition, what is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. An image processing method, performed by a computer device comprising a central processing unit (CPU) and a graphic card configured to undertake an image output task, the graphic card comprising a graphics processing unit (GPU), a graphic card shader, and rendering pipelines, and the method comprising:

inputting, by using an input graphic card shader buffer block connected to the graphic card shader, a target compression texture resource of a target image to the graphic card shader, the target compression texture resource having a corresponding compression texture format, the target compression texture resource comprising a plurality of compression texture blocks;

allocating a plurality of target work groups for decoding to the plurality of compression texture blocks in the graphic card shader, wherein the graphic card shader is a processing unit run in the graphic card and includes a plurality of work groups independent of each other, and each work group being a sub-processing unit having a decoding capability;

distributing each compression texture block to a corresponding target work group of the plurality of work groups in the graphic card shader;

decoding in parallel, by the target work groups in the graphic card shader, the compression texture blocks according to the compression texture format, to obtain target texture data of the target image, the target texture data comprising decoded data corresponding to the compression texture blocks; and performing, by the rendering pipelines, image rendering according to the target texture data to obtain the target image, wherein the rendering pipelines are parallel processing units that process graphic signals inside the graphic card and are independent of each other.

2. The method according to claim 1, wherein a target work group is a sub-processing unit with a decoding capability in the graphic card shader, and the target work groups are independent of each other; and a target work group decodes the received compression texture block by using an algorithm instruction used for decoding the target compression texture resource.

3. The method according to claim 1, wherein the graphic card further comprises a decoding pipeline, and the graphic card shader works according to a procedure specified in the decoding pipeline.

4. The method according to claim 3, wherein each of the rendering pipelines comprises a virtual first graphic card address space, and the decoding pipeline comprises a virtual second graphic card address space; and each of the first graphic card address space and the second graphic card address space has a mapping relationship with a same texture storage space.

5. The method according to claim 4, wherein the method further comprises:

after a target work group in the graphic card shader decodes the received compression texture block, buffering, in the texture storage space according to the mapping relationship between the second graphic card address space and the texture storage space, decoded data obtained through the decoding by the target work group; and the performing image rendering according to the target texture data by using the rendering pipeline to obtain the target image comprises:

after the decoded data corresponding to the compression texture blocks are stored in the texture storage space, performing, according to the mapping relationship between the first graphic card address space and the texture storage space, the image rendering according to the target texture data in the texture storage space by using the rendering pipelines to obtain the target image.

6. The method according to claim 4, further comprising:

allocating the texture storage space to the target image in a local space of the computer device by using the rendering pipeline;

mapping the first graphic card address space to the texture storage space by using the rendering pipeline, and transferring a space identifier of the texture storage space to the decoding pipeline; and mapping the second graphic card address space to the texture storage space by using the decoding pipeline according to the space identifier.

7. The method according to claim 3, wherein the inputting the target compression texture resource of the target image comprises:

loading the target compression texture resource of the target image from a local space of the computer device by using the rendering pipeline; and the method further comprises:

distributing the target compression texture resource to the decoding pipeline by using the rendering pipeline; and after the decoding pipeline successfully receives the target compression texture resource, transmitting a decoding notification to the graphic card shader through the decoding pipeline, to notify the graphic card shader to perform the operation of allocating a plurality of target work groups for decoding to the plurality of compression texture blocks.

8. The method according to claim 7, wherein the computer device has a graphic card decoding mode, and the graphic card decoding mode is a mode of performing decoding by using the graphic card shader; and the method further comprises:

detecting a mode status that the graphic card decoding mode is in by using the rendering pipeline, the mode status comprising a mode on state or a mode off state;

when the mode status is the mode on state, performing the operation of distributing the target compression texture resource to the decoding pipeline by using the rendering pipeline; and when the mode status is the mode off state, invoking a graphic card driver central processing unit (CPU) by using the rendering pipeline to decode the compression texture blocks in the target compression texture resource to obtain the target texture data of the target image.

9. The method according to claim 8, wherein the target image is a target game picture image in a target game; and the method further comprises:

obtaining an offline decoded data set of the target game by using the rendering pipeline, the offline decoded data set comprising an image identifier of one or more game picture images in the target game and texture data associated with each image identifier, texture data associated with an image identifier being obtained by performing offline decoding on a compression texture resource of a game picture image indicated by the image identifier;

performing identifier hitting on the image identifier in the offline decoded data set by using the rendering pipeline according to an image identifier of the target image;

when a hit on the image identifier fails, performing the operation of detecting a mode status that the graphic card decoding mode is in by using the rendering pipeline; and when a hit on the image identifier succeeds, loading texture data associated with the hit image identifier from the offline decoded data set by using the rendering pipeline, and using the loaded texture data as the target texture data of the target image.

10. The method according to claim 9, wherein the operation of allocating a plurality of target work groups for decoding to the plurality of compression texture blocks in a graphic card shader is performed when the image identifier of the target image does not exist in the offline decoded data set; and when the image identifier of the target image exists in the offline decoded data set, the target texture data of the target image is loaded from the offline decoded data set.

11. The method according to claim 9, wherein the method further comprises:

detecting a decoding capability related to the target compression texture resource of the graphic card driver CPU by using the rendering pipeline;

in response to detecting that the graphic card driver CPU has the decoding capability, performing the operation of obtaining an offline decoded data set of the target game by using the rendering pipeline; and in response to detecting that the graphic card driver CPU does not have the decoding capability, invoking a game engine CPU of the target game by using the rendering pipeline to decode the compression texture blocks in the target compression texture resource to obtain the target texture data of the target image.

12. The method according to claim 1, wherein the method further comprises:

when one or more of the compression texture blocks in the target compression texture resource fail to be decoded by the graphic card shader, invoking a graphic card driver central processing unit (CPU) to decode the compression texture blocks in the target compression texture resource to obtain the target texture data of the target image.

13. The method according to claim 1, wherein the graphic card shader comprises M work groups, M being an integer greater than 1; and the allocating a plurality of target work groups for decoding to the plurality of compression texture blocks in a graphic card shader comprises:

traversing the plurality of compression texture blocks, and determining a current compression texture block being traversed currently;

when an unallocated remaining work group exists in the M work groups in the graphic card shader, allocating one target work group for decoding to the current compression texture block from the remaining work group; and when all the work groups in the M work groups have been allocated to compression texture blocks, allocating one target work group for decoding to the current compression texture block from the M work groups.

14. The method according to claim 1, wherein a decoding procedure performed by the graphic card shader is independently encapsulated in one software development kit (SDK), to perform decoding by invoking the SDK when a compression texture resource of an image needs to be decoded.

15. An image processing apparatus, the apparatus being deployed on a computer device, and comprising:

a graphic card configured to undertake an image output task and a computer storage medium, the graphic card comprising a graphics processing unit (GPU), a graphic card shader, and rendering pipelines, the computer storage medium storing one or more instructions, the one or more instructions being suitable to be loaded by the graphic card and perform:

inputting, by using an input graphic card shader buffer block connected to the graphic card shader, a target compression texture resource of a target image to the graphic card shader, the target compression texture resource having a corresponding compression texture format, the target compression texture resource comprising a plurality of compression texture blocks;

allocating a plurality of target work groups for decoding to the plurality of compression texture blocks in the graphic card shader, wherein the graphic card shader is a processing unit run in the graphic card and includes a plurality of work groups independent of each other, and each work group being a sub-processing unit having a decoding capability;

distributing each compression texture block to a corresponding target work group of the plurality of work groups in the graphic card shader, decoding in parallel, by the target work groups in the graphic card shader, the compression texture blocks according to the compression texture format, to obtain target texture data of the target image, the target texture data comprising decoded data corresponding to the compression texture blocks; and performing, by the rendering pipelines, image rendering according to the target texture data to obtain the target image, wherein the rendering pipelines are parallel processing units that process graphic signals inside the graphic card and are independent of each other.

16. The apparatus according to claim 15, wherein a target work group is a sub-processing unit with a decoding capability in the graphic card shader, and the target work groups are independent of each other; and a target work group decodes the received compression texture block by using an algorithm instruction used for decoding the target compression texture resource.

17. The apparatus according to claim 15, further comprising a graphic card driver central processing unit (CPU) configured to:

when one or more of the compression texture blocks in the target compression texture resource fail to be decoded by the graphic card shader, decode the compression texture blocks in the target compression texture resource to obtain the target texture data of the target image.

18. The apparatus according to claim 15, wherein the graphic card shader comprises M work groups, M being an integer greater than 1; and the allocating a plurality of target work groups for decoding to the plurality of compression texture blocks in a graphic card shader comprises:

traversing the plurality of compression texture blocks, and determining a current compression texture block being traversed currently;

when an unallocated remaining work group exists in the M work groups in the graphic card shader, allocating one target work group for decoding to the current compression texture block from the remaining work group; and when all the work groups in the M work groups have been allocated to compression texture blocks, allocating one target work group for decoding to the current compression texture block from the M work groups.

19. The method according to claim 1, wherein the decoding of the compression texture blocks does not require participation of the CPU.

20. A non-transitory computer storage medium, the computer storage medium storing one or more instructions, the one or more instructions being suitable to be loaded and executed by a graphic card, the graphic card being configured to undertake an image output task, and the graphic card comprising a graphics processing unit (GPU), a graphic card shader, and rendering pipelines, wherein the one or more instructions cause the graphic card to perform:

inputting, by using an input graphic card shader buffer block connected to the graphic card shader, a target compression texture resource of a target image to the graphic card shader, the target compression texture resource having a corresponding compression texture format, the target compression texture resource comprising a plurality of compression texture blocks;

allocating a plurality of target work groups for decoding to the plurality of compression texture blocks in the graphic card shader, wherein the graphic card shader is a processing unit run in the graphic card and includes a plurality of work groups independent of each other, and each work group being a sub-processing unit having a decoding capability;

distributing each compression texture block to a corresponding target work group of the plurality of work groups in the graphic card shader;

decoding in parallel, by the target work groups in the graphic card shader, the compression texture blocks according to the compression texture format, to obtain target texture data of the target image, the target texture data comprising decoded data corresponding to the compression texture blocks; and performing, by the rendering pipelines, image rendering according to the target texture data to obtain the target image, wherein the rendering pipelines are parallel processing units that process graphic signals inside the graphic card and are independent of each other.

\* \* \* \* \*